US005563982A

United States Patent [19]
Wang et al.

[11] Patent Number: 5,563,982
[45] Date of Patent: *Oct. 8, 1996

[54] APPARATUS AND METHOD FOR DETECTION OF MOLECULAR VAPORS IN AN ATMOSPHERIC REGION

[75] Inventors: C. David Wang, Melville; James Thompson, Greenlawn; William T. Walter, Huntington, all of N.Y.

[73] Assignee: AIL Systems, Inc., Deer Park, N.Y.

[*] Notice: The term of this patent shall not extend beyond the expiration date of Pat. No. 5,276,772.

[21] Appl. No.: 154,732

[22] Filed: Nov. 19, 1993

Related U.S. Application Data

[63] Continuation-in-part of Ser. No. 648,194, Jan. 31, 1991, Pat. No. 5,276,772.
[51] Int. Cl.$^6$ .................... G06E 1/00; G06E 3/00
[52] U.S. Cl. .................. 395/22; 395/21; 395/23; 395/24; 356/345; 356/346
[58] Field of Search .................... 395/21, 22, 23, 395/24; 356/345, 346

[56] References Cited

U.S. PATENT DOCUMENTS

| | | |
|---|---|---|
| 3,646,588 | 2/1972 | Van Popta . |
| 3,653,042 | 3/1972 | Molho . |
| 4,760,604 | 7/1988 | Cooper et al. . |
| 4,851,854 | 7/1989 | Drogin . |
| 5,103,431 | 4/1992 | Freeman et al. ............ 367/135 |
| 5,167,006 | 11/1992 | Furuta et al. . |
| 5,175,798 | 12/1992 | Taylor et al. . |
| 5,216,750 | 6/1993 | Smith . |
| 5,251,008 | 10/1993 | Masutani ................ 356/346 |
| 5,268,692 | 12/1993 | Grosch et al. . |
| 5,276,772 | 1/1994 | Wang et al. ............... 395/27 |

OTHER PUBLICATIONS

Wang, C. D, and Thompson, J. P., "An adaptive Data Sorter Based on PNN", 1991 IEEE Int'l Conf. on Neural Net, Singapore.

"An Optical Fourier/Electronic Neurocomputer Automated Inspection System", by D. E. Glover, *IEEE International Conference on Neural Networks*, pp. I–569 to I–576 (Jul. 1988).

"A VLSI Implementation of a Neural Car Collision Avoidance Controller", by Nijhuis, et al., *IEEE International Joint Conference on Neural Networks*, pp. I–493 to I–499 (Jul. 1991).

"Optimum Frequencies Selection for Radar Target Classification by Neural Network", by Xu, et al., *IEEE International Conference on Neural Networks*, pp. 1236 to 1241 (Nov. 1991).

(List continued on next page.)

Primary Examiner—Raymond J. Bayerl
Assistant Examiner—A. Katbab
Attorney, Agent, or Firm—Hoffmann & Baron

[57] ABSTRACT

Apparatus for detecting molecular vapors in an atmospheric region includes an interferometer which monitors light parameter data signals received and provides an interferometer light parameter signal corresponding to the light parameter data signals at a plurality of frequencies. The apparatus further includes an interferogram detector/converter which records and digitizes the interferometer light parameter signal to generate a plurality of discrete data points wherein each discrete data point corresponds to the interferometer light parameter signal at a specific frequency. The apparatus also includes a Fourier transform circuit for receiving the discrete interferometer light parameter signal and providing a Fourier transformed molecular parameter data signal. The apparatus further includes a probabilistic neural network for receiving and sorting the Fourier transformed molecular parameter data signals without the use of a priori training data.

6 Claims, 9 Drawing Sheets

OTHER PUBLICATIONS

"The Application of Feed–Forward Connectionist Models to ESM Bearing Estimation Using Signal Amplitude", by Steen, et al., *IEEE Collog. No. 24: Signal Processing Techniques for Electronic Warfare*, pp. 4/1–6 (Jan. 1992).

"Neural Network Based Optimum Radar Target Detection in Non–Gaussian Noise", by Kim, et al., *IEEE International Conference on Neural Networks*, pp. III–654 to III–659, FIGS. 3–5 (Jun. 1992).

"Minimum Description Length Pruning and Maximum Mutual Information Training of Adaptive Probabilistic Neural Networks", by Fakhr, et al., *IEEE International Conference on Neural Networks*, pp. 1338 to 1342 (Apr. 1993).

"Probabalistic Neural Networks for Classification, Mapping, or Associative Memory", by Donald F. Specht, *IEEE International Conference on Neural Networks*, vol. 1, pp. 525–532 (Jul. 1988).

"The Use of Probabilistic Neural Networks to Improve Solution Times for Hull–to–Emitter Correlation Problems", by P. Susie Maloney and Donald F. Specht, published by the *International Joint Conference on Neural Networks*, vol. 1, pp. 289–294 (Jun. 1989).

"An Application of Neural Net Technology to Surveillance Information Correlation and Battle Outcome Prediction"by P. Susie Maloney, published by the IEEE pp. 948–955 (1989).

"Probabilistic Neural Networks and the Polynomial Adaline as Complementary Techniques for Classification" by Donald F. Specht, Published in *IEEE Transactions of Neural Networks*, vol. 1, No. 1, pp. 111–121 (Mar.).

"Survey of Neural Network Technology for Automatic Target Recognition" By Michael W. Roth, published in *IEEE Transactions of Neural Networks*, vol. 1, No. 1, pp. 28–43 (Mar. 1990).

APPARATUS AND METHOD FOR DETECTION OF MOLECULAR VAPORS IN AN ATMOSPHERIC REGION

CROSS REFERENCE TO RELATED APPLICATION

This application is a continuation-in-part of U.S. patent application Ser. No. 07/648,194 filed Jan. 31, 1991, now U.S. Pat. No. 5,276,772, the disclosure of which is incorporated herein by reference.

BACKGROUND OF THE INVENTION

1. Field of the Invention

This invention relates to probabilistic neural networks, and more particularly relates to an adaptive probabilistic neural network that can sort input parameter data signal description words relating to molecular vapor concentrations without the use of a priori training data.

2. Description of the Prior Art

Radar emitter pulse sorting and radar emitter identification are the primary functions of electronic support measure (ESM) and electronic counter measure (ECM) systems. There are three basic steps involved in the emitter identification process. First, the input pulse signals undergo an initial level of analysis and differentiation commonly referred to as "sorting" or "pulse-by-pulse deinterleaving". The sorting process involves analysis of the input signals to achieve an initial grouping of pulses from each emitter in the collected pulse sequence. If a high percentage of pulses are correctly sorted and grouped during the first sorting level, then only a small number of pulses will undergo a second level of deinterleaving. However, invariably many input pulse signals are not capable of being correctly sorted because the signals can not be easily differentiated by the system. The sorting system is not able to recognize the input signals because the input signals are often noisy, inaccurate and corrupt with additional or missing signal parameter components or information. The pulse groups which were not correctly sorted and grouped by the system at the first level of analysis require a second level of analysis commonly referred to as "second level deinterleaving". This second processing and sorting level requires multiple and complex sorting algorithms which occupy a great deal of computer time. Once all of the input signals have been sorted and deinterleaved by the first and second levels of analysis, they are transferred to a third stage of processing commonly referred to as emitter identification. During this stage, the sorted groups are analyzed so that the radar emitter transmitting each type of signal can be identified for ESM and ECM purposes.

In the past, various rule-based techniques were developed for sorting digitized pulse signals. One of the earlier rule-based sorting systems is commonly referred to as the histogram method. The histogram method compares each input pulse parameter signal against a group of preset signal parameters. The comparison is performed to determine if the parameters of the input pulse parameter signal can be classified within the group of preset signal parameter values. However, the histogram method may not accurately sort the incoming signal when even one parameter of the input pulse parameter signal does not match the preset signal parameter values. This makes the histogram method undesirable. The histogram method is also undesirable because the incoming signals must be input to the system at a relatively slow rate as compared to the rate that the pulse signals are transmitted by the radar emitter. Therefore, a sorting system utilizing the histogram method is not readily able to produce a real time system response to incoming radar pulse signals.

Another early rule-based sorting technique is commonly referred to as "adaptive binning." Adaptive binning compares individual parameters of the input pulse signal to preset signal parameter values. Each input pulse signal can have numerous parameter values. The adaptive binning system is relatively slow in operating because only one parameter comparison is undertaken at a time. Therefore, successive comparisons are not made until preceding comparisons are complete.

Additionally, the adaptive binning system is very rigid, inflexible and incapable of sorting input signals having parameter value errors. For example, if an input pulse signal consists of ten parameters, and one parameter of the group of ten parameters is out of range because the signal is noisy and incapable of being properly read by the system, the input pulse signal would not be correctly sorted. This type of incorrect sorting can occur even if the remaining nine signal parameters match the corresponding preset signal parameter values exactly. Since the system is so inflexible and incapable of sorting inputs having only one corrupt input pulse parameter, optimal results for sorting real data only approach approximately 88% accuracy. The adaptive binning system is also undesirable because it can not easily provide a "joint" quality measurement of system performance and sorting accuracy.

It has been proposed by Donald F. Specht, in his article, "Probabilistic Neural Networks for Classification, Mapping, or Associative Memory", published in the Proceedings of the 1988 IEEE International Conference on Neural Networks, Vol. 1, pp. 525–32, July 1988, to use a probabilistic neural network (PNN) to recognize input signals based upon a priori test data. Specht proposed using a PNN to search incoming data signals for a priori data patterns. The a priori test data is essentially a library or directory of patterns representing a database for the system. The probabilistic neural network developed by Specht is a multi-layer feed-forward network which uses sums of Gaussian distributions to estimate a probability density function based upon a group of a priori training patterns. The estimated probability density function is then used to sort and match new input data to the a priori training patterns.

In another article, "The Use of Probabilistic Neural Networks to Improve Solution Times for Hull-To-Emitter Correlation Problems", published by the International Joint Conference on Neural Networks, Vol. 1, pp. 289–94, June 1989, P. Susie Maloney and Donald F. Specht disclose applying a probabilistic neural network to hull-to-emitter correlation problems for electronic intelligence (ELINT) systems. However, this process operates utilizing already sorted pulse data and does not use a probabilistic neural network for real time, non a priori pulse sorting. Real time, non a priori pulse sorting is difficult because real data input signals are often noisy, inaccurate, and corrupt with additional or missing signal parameter components and information. In addition, the output probability density function for a specific signal emitter may have multiple disjoint boundaries where an individual boundary may be overlapped with another emitter probability density function. Such input signal parameters cannot be accurately approximated by an n-dimensional Gaussian distribution as proposed by Specht.

Remote sensing of molecular species which are present as gases or vapors in the atmosphere is typically accomplished with a spectrometer that can detect and identify the molecular spectral signatures (the infrared radiation) reaching the spectrometer. Other sensing methods require physical contact between the molecules themselves and some part of the measuring instrument. The vibrational-rotational energy-level structure of each molecule is responsible for the emission or absorption spectra that furnishes a unique identifying spectral "fingerprint" within the so-called fingerprint region of the infrared spectrum between 7 and 14 µm (1400 and 700 $cm^{-1}$). Hyperspectral sensing is often required because the spectral feature widths vary from <0.1 $cm^{-1}$ in diatomic molecules to >25 $cm^{-1}$ for complex molecules. Molecules are monitored for emission or absorption depending on whether they are warmer or cooler than the source of infrared radiation. An active spectrometer system, which typically includes a globar or laser, illuminates the atmospheric molecules with radiation from the infrared source. On the contrary, a passive system utilizes naturally-occurring thermal energy emanating from a region or object behind (background) the molecules of interest to determine the spectral signatures of the atmospheric molecules.

Both the active and passive systems seek to enhance the low signal-to-noise ratio (SNR) available from a dilute region of airborne molecules. In a passive system, the signal strength depends on a small environmentally-produced temperature difference $\Delta T$, (a few ° C.) between the molecular vapor species of interest and thermal radiation from the background. Signal strength from an active system depends on a return of scattered radiation from the illuminating source. Most practical applications of molecular sensing require an examination for the presence of more than one molecular species. However, simultaneous or concurrent detection and identification of a list of gases and vapors is difficult. The spectral fingerprint of each molecule can be enhanced either by restricting (filtering) the light reaching the detector to a molecule's fingerprint characteristic frequencies or by postprocessing a broadband detected signal with spectral filters tuned to each molecule of interest. Concurrent monitoring of more than one molecular vapor fingerprint is not practical with traditional monitoring systems.

OBJECTS AND SUMMARY OF THE INVENTION

It is an object of the present invention to provide a system and method to sort unknown input molecular data signals of more than one molecule vapor fingerprint without the use of a priori training data.

It is yet a further object of the present invention to provide a molecular vapor data signal identification sorting system and method which overcomes the inherent disadvantages of known molecular vapor sorting techniques.

In accordance with one form of the present invention, apparatus for detecting molecular vapor in an atmospheric region includes at least an interferometer, an interferogram detector/converter and a probabilistic neutral network processor.

The interferometer includes an input port for receiving light parameter data signals and an output port for providing an interferometer molecular parameter data signal which corresponds to the intensity of the light parameter data signal at a plurality of frequencies. An interferogram detector/converter is electrically coupled to the output port of the interferometer for receiving the interferometer molecular parameter data signal and providing an output signal. The output signal of the interferogram detector/converter has a first plurality of discrete data signals which corresponds to the interferometer molecular parameter data signal at a specific frequency. The output signal of the interferometer detector/converter is provided to the probabilistic neural network processor.

The probabilistic neural network processor is electrically coupled to the interferogram detector/converter so as to receive the interferogram detector/converter output signal. The probabilistic neural network includes at least one cluster processor circuit, a decision logic circuit and a switching circuit.

The cluster processor circuit includes an input buffer memory circuit essentially consisting of a group of serially connected memory circuits (i.e., registers). Input molecular parameter data signals which are provided to the neural network by the interferogram detector/converter are temporarily stored in the serially connected memory circuits of the input buffer memory circuit. The cluster processor circuit also includes a group of processing elements connected to the input buffer memory circuit, exponential function circuits coupled to corresponding processing elements and a summation circuit connected to each exponential function circuit. These components interact to generate a probability density function estimation value signal for the cluster processor circuit. The probability density function estimation value signal is generated by using both assigned input molecular parameter data signals temporarily stored in the memory circuits and current unassigned input molecular parameter data signals. The probability density function estimation value signal of a cluster processor circuit represents the probability that the current unassigned input molecular parameter data signal closely matches or belongs to the group of assigned input molecular parameter data signals currently stored in the corresponding cluster processor circuit.

The decision logic circuit is coupled to the summation circuit of each cluster processor circuit. The decision logic circuit compares the output signal of each summation circuit to at least a first threshold value signal, and more preferably, also to a second threshold value signal. The output signal of each summation circuit corresponds to a probability density function estimation value of the cluster processor circuit. The decision logic circuit comparison is made to determine if the probability density function estimation value signal is at least equal to the first threshold value signal, at most equal to the second threshold value signal, or less than the first threshold value signal and greater than the second threshold value signal. The comparison in the decision logic circuit occurs simultaneously for all currently operating cluster processor circuits. The sorting process can be characterized as an internal competition among the currently operating cluster processor circuits to determine which currently operating cluster processor circuit has the greatest probability density function estimation value signal and which assigned input molecular parameter data signal stored in the respective cluster processor circuit best matches the current unassigned input molecular parameter data signal.

The decision logic circuit is coupled to the switching circuit. The decision logic circuit generates and provides a decision address signal to the switching circuit. The decision address signal corresponds to the cluster processor circuit currently storing assigned input molecular parameter data signals that best match the current unassigned input molecular parameter data signal (i.e., the cluster processor circuit having the highest probability density function estimation value signal). If the probability density function estimation value signal of all currently operating cluster processor circuits is less than the first threshold value signal and less than the second threshold value signal, then the decision logic circuit provides a decision address signal to the switching circuit instructing the switching circuit to activate a previously non-operating cluster processor circuit.

The switching circuit receives both the decision address signal and the current unassigned input molecular parameter data signal being scrutinized. The switching circuit then provides the current unassigned input molecular parameter data signal to the input buffer memory circuit of the cluster processor circuit corresponding to the decision address signal transmitted by the decision logic circuit. The newly assigned input molecular parameter data signal is temporarily stored in the first register of the input buffer memory circuit of the corresponding cluster processor circuit. When the current input molecular parameter data signal is sorted and stored in the input buffer memory circuit, the previously stored input molecular parameter data signals are sequentially transmitted to the next register in the group of serially connected registers for further storage. Therefore, upon introduction of the current input molecular parameter data signal to the first register, the assigned input molecular parameter data signal that was previously stored in the first register is shifted to the second register of the input buffer memory circuit. Furthermore, the input molecular parameter data signal stored in the second register is shifted to the third register and so on. The input molecular parameter data signal that was in the last register of the input buffer memory circuit is considered "outdated" and not valuable for determining the next probability density function estimation value signal. Accordingly, this "outdated" input molecular parameter data signal is discarded and replaced by a subsequent input molecular parameter data signal.

The switching circuit will activate a previously non-operating cluster processor circuit when the probability density function estimation value signal computed for all currently operating cluster processor circuits is less than the first and the second threshold value signals. For example, a probability density function estimation value signal of less than 10% for every currently operating cluster processor circuit indicates that the current unassigned input molecular parameter data signal does not match the assigned input molecular parameter data signals stored in the currently operating cluster processor circuits. Accordingly, a previously non-operating cluster processor circuit is activated to store the current unassigned input molecular parameter data signal. The new cluster processor circuit corresponds to a new sorting group. The newly assigned input molecular parameter data signal will be stored in the first register of the input buffer memory circuit of the newly activated cluster processor circuit.

A preferred form of the apparatus for detecting molecular vapor in an atmospheric region utilizing a real time adaptive probabilistic neural network system and method for data sorting and storing, as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

Figure 1:
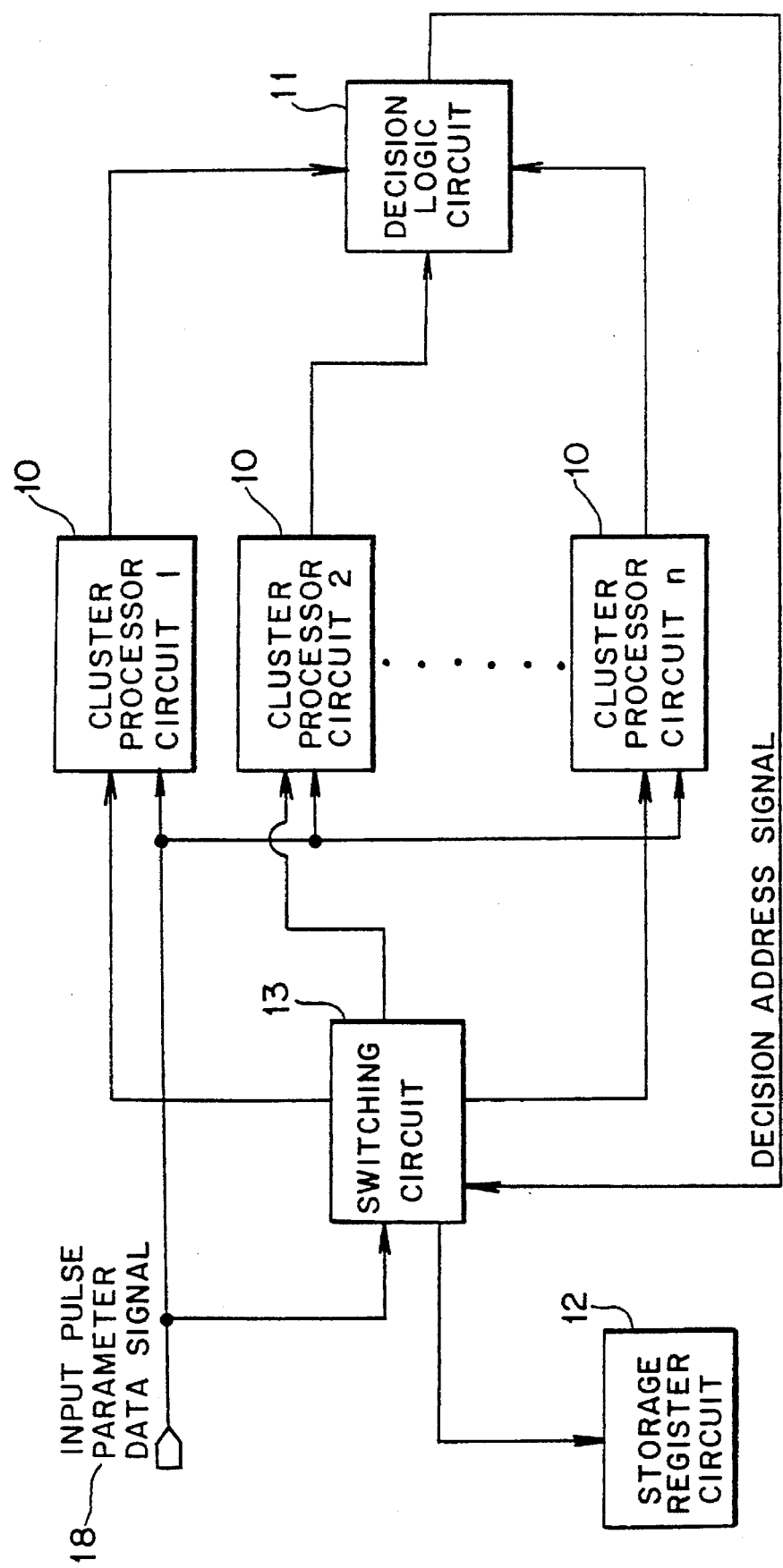
FIG. 1 is a block diagram of an adaptive probabilistic neural network system utilized in the present invention.

Referring now to FIG. 1 of the drawings, a preferred real time data sorting adaptive probabilistic neural network (APNN) constructed in accordance with the present invention will now be described. The APNN includes a plurality of identical subunits commonly referred to as cluster processor circuits 10. Each cluster processor circuit may be classified as a currently operating cluster processor circuit, a newly operating cluster processor circuit or a non-operating cluster processor circuit. Each cluster processor circuit is operatively coupled to a decision logic circuit 11 and to a switching circuit 13. Each currently operating cluster processor circuit generates and provides a probability density function estimation value signal to the decision logic circuit. The decision logic circuit is also coupled to the switching circuit. The decision logic circuit generates and provides a decision address signal to the switching circuit. The decision address signal identifies the cluster processor circuit which results in correct sorting and temporary storage of a current unassigned input pulse parameter data signal 18.

Figure 2:
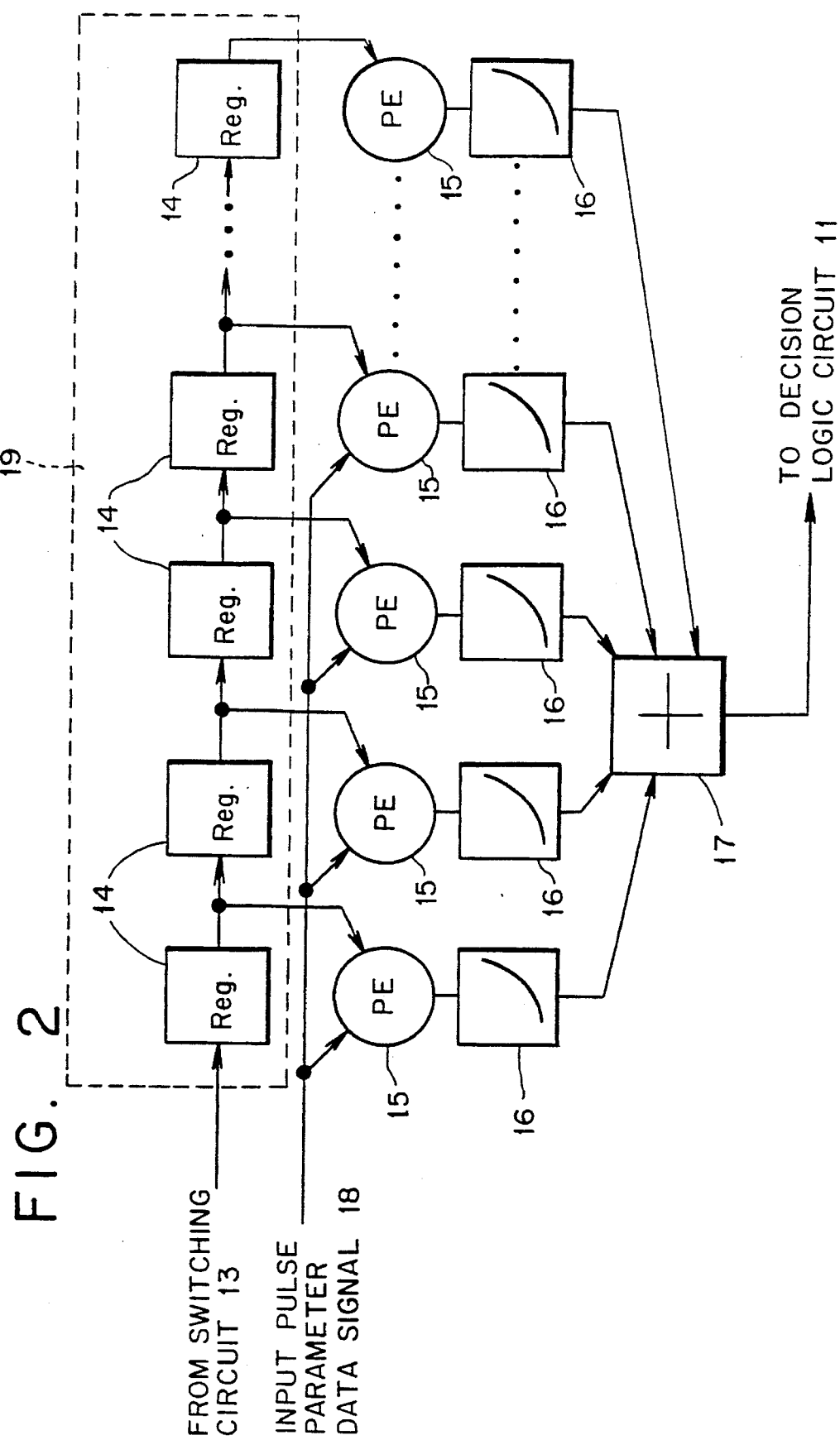
FIG. 2 is a block diagram of one cluster processor used in the neural network shown in FIG. 1.

A preferred form of the cluster processor circuit 10 is illustrated by FIG. 2. The cluster processor circuit includes a plurality of serially connected registers 14 (i.e., buffer memory circuits). The serially connected registers store the input pulse parameter data signal 18 assigned to the respective cluster processor circuit by the switching circuit 13. The combination of serially connected registers within the cluster processor circuit defines a pulse buffer memory circuit 19.

Each cluster processor circuit 10 also includes a plurality of processing elements 15. Each of the plurality of processing elements is coupled to a corresponding register 14 of the pulse buffer memory circuit 19. Each processing element receives assigned input pulse parameter data signals stored in a respective register of the pulse buffer memory circuit of the cluster processor circuit. Each processing element is also coupled to the system input which allows each processing element to receive the current unassigned input pulse parameter data signal 18. As described below, a processing element is designed to generate and transmit a signal to an exponential function circuit 16.

The cluster processor circuit 10 also includes a plurality of exponential function circuits 16. Each of the plurality of exponential function circuits is coupled to a corresponding processing element 15. Each exponential function circuit is configured to receive the output signal of only one of the plurality of processing elements. Each exponential function circuit performs an exponential function on the output signal of the processing element.

The cluster processor circuit 10 also includes a summation circuit 17. The summation circuit is coupled to each of the plurality of exponential function circuits 16 of the respective cluster processor circuit. The output signal of each exponential function circuit is received by the summation circuit. The summation circuit processes the exponential function circuit output signals of the corresponding cluster processor circuit. The output signal of the summation circuit also represents the output signal of the corresponding cluster processor circuit. The output signal of the cluster processor circuit corresponds to a probability density function estimation value of the cluster processor circuit. A probability density function estimation value is simultaneously calculated for all currently operating cluster processor circuits. A probability density function estimation value signal represents the probability that the current unassigned input pulse parameter data signal matches or belongs to the group of assigned input pulse parameter data signals currently stored in the registers 14 of the pulse buffer memory circuit 19 of the respective cluster processor circuit.

The cluster processor circuits 10 of the neural network system may employ parallel processing using transputers. A suitable transputer which may be used is Part No. MTM-PC, which is a reconfigurable multi-transputer, manufactured by Inmos Corporation.

The decision logic circuit 11 is coupled to the summation circuit 17 of each cluster processor circuit 10. The decision logic circuit includes a plurality of comparators. The decision logic circuit is designed to compare the probability density function estimation value signal of each currently operating cluster processor circuit to at least a first threshold value signal. The comparison process occurs simultaneously for all currently operating cluster processor circuits. In response to this comparison, a decision address signal is generated and transmitted by the decision logic circuit to the switching circuit 13. The decision address signal represents the cluster processor circuit currently storing the assigned input pulse parameter data signals which best match the current unassigned input pulse parameter data signal. The decision address signal can correspond to any currently operating cluster processor circuit or it can activate a non-operating cluster processor circuit so that the pulse buffer memory circuit 19 of the newly operating cluster processor circuit will store the current input pulse parameter data signal.

The switching circuit 13 is operatively coupled to the decision logic circuit 11 and to the pulse buffer memory circuit 19 of each cluster processor circuit. The switching circuit also receives the current unassigned input pulse parameter data signal 18. Upon receiving the decision address signal from the decision logic circuit, the switching circuit transmits the current unassigned input pulse parameter data signal to the pulse buffer memory circuit 19 of the cluster processor circuit 10 corresponding to the decision address signal received.

A storage register circuit 12 is coupled to the switching circuit 13. The storage register circuit receives the current unassigned input pulse parameter data signal transferred by the switching circuit. The switching circuit transfers, to the storage register circuit, the input pulse parameter data signals which can not be properly sorted by the present sorting method. This assignment to the storage register circuit corresponds to a probability density function estimation value signal of the respective cluster processor circuit which is less than the first threshold value signal and greater than the second threshold value signal. The input pulse parameter data signal in the storage register is maintained for possible future analysis and processing. Therefore, the input pulse parameter data signal may be correctly sorted to one of the plurality of cluster processor circuits.

The operation of the real time adaptive probabilistic neural network (APNN) for data sorting, constructed in accordance with the present invention, will now be described. Initially, the registers 14 of the pulse buffer memory circuit 19 of each cluster processor circuit 10 are empty and contain no assigned input pulse parameter data signals. The APNN system is designed so that a priori training data does not have to be stored in the registers at the beginning of system operation in order to effectuate sorting. The APNN system operates to develop its own sorting groups as the current unassigned input pulse parameter data signals 18 are introduced to the system. The sorting groups are defined by an internal competition among cluster processor circuits 10. Each currently operating cluster processor circuit represents a different sorting group corresponding to a different type of input pulse parameter data signal received. If the calculated probability density function estimation value signal of each currently operating cluster processor is less than at least a first threshold value signal, then a match does not exist between the current unassigned input pulse parameter data signal and the assigned input pulse parameter data signal stored in each currently operating cluster processor circuit. Therefore, a previously non-operating cluster processor circuit will be activated to establish a newly operating cluster processor circuit for storing the current input pulse parameter data signal.

The input pulse parameter data signal 18 introduced to the APNN system can represent any collection of measured pulse data. In the preferred embodiment, the input pulse parameter data signal is represented by a series of pulse signal parameters X where

X=[FF, PA, PW, AOA]

and
FF=fine frequency
PA=pulse amplitude
PW=pulse width
AOA=angle of arrival

For certain ESM systems, the AOA measurements are expressed by relative phases between three antennas to a reference antenna which itself corresponds to a vector of three components where:

AOA=[coarse AOA, fine AOA, extra-fine AOA]

Initially, when the system is activated, only a first cluster processor circuit of the plurality of cluster processor circuits is "currently operating." All other cluster processor circuits within the APNN system are "non-operating." The APNN system is initialized by receiving and providing the first input pulse parameter data signal 18 into the currently operating first cluster processor circuit. As the first input pulse parameter data signal is introduced to the APNN system, it is provided to each processing element 15 of the currently operating first cluster processor circuit. A probability density function estimation value signal is then generated in the currently operating first cluster processor circuit by the combined effects of the processing elements, the exponential function circuits, and the summation circuit. The probability density function estimation value signal is outputted by the summation circuit of the currently operating first cluster processor circuit according to the first input pulse parameter data signal.

The probability density function estimation value signal is generated according to the formula:

$$Pr(X_i) = \frac{1}{M} \sum_{j=1}^{M} EXP \left[ -\frac{(X_j - W_{ij})^2}{SIGMA^2} \right]$$

where

PR=probability density function estimation value

X=the current input pulse parameter data

W=previous input pulse parameter which is currently stored in a register of the pulse buffer i=cluster processor number corresponding to the emitter group or bin number j=current input data pulse signal parameter being analyzed Sigma=smoothing factor which represents the standard deviation of the probability density function (a constant set by the system operator)

M=total number of parameters contained in the input data pulse (i.e., FF, PA, PW . . . )

EXP=the exponential function

The probability density function estimation value signal is generated by the currently operating first cluster processor circuit in the following manner. The current unassigned input pulse parameter data signal to be sorted is received and provided to each processing element 15 of the first cluster processor circuit. Each processing element determines a value for the expression:

$$\left[ -\frac{(X_j - W_{ij})^2}{SIGMA^2} \right]$$

The above expression correlates to subtracting each parameter of the assigned input pulse parameter data signals stored in the registers 14 of the pulse buffer memory circuit 19 from the current unassigned input pulse parameter data signal. Since the current unassigned input pulse parameter data signal is the first data signal provided to the APNN system, there are no signals stored in the serially connected registers of the pulse buffer memory circuit. To account for the lack of stored data in the pulse buffer memory circuit, logic zeros are transmitted from each serially connected register to each processing element so that a value for the above expression can be generated. The difference between the input pulse parameter data signals stored in the registers (here it is logic zero) and the current unassigned input pulse parameter data signal is then squared and divided by Sigma$^2$, where Sigma has a constant value. The resulting value is provided to the exponential function circuit 16. The exponential function circuit performs an exponential function and generates a signal which is provided to the summation circuit 17.

The summation circuit 17 adds all of the output signals of the exponential function circuits 16. The output signal of the summation circuit, which corresponds to the output signal of the cluster processor circuit 10, is a measure of the probability or likelihood that the current unassigned input pulse parameter data signal matches the assigned input pulse parameter data signal stored in the pulse buffer memory circuit of the respective cluster processor circuit. For example, a probability density function estimation value signal of 80% represents a high probability of correctly sorting the current unassigned input pulse parameter data signal if the current unassigned input pulse parameter data signal is stored in the respective cluster processor circuit. However, a probability density function estimation value signal of 10% represents a decisive mismatch for the current unassigned input pulse parameter data signal and the assigned input pulse parameter data signal stored in the respective cluster processor circuit.

The decision logic circuit 11 contains at least a first threshold value signal. The decision logic circuit receives and compares the probability density function estimation value signal of the currently operating first cluster processor circuit to at least the first threshold value signal. The decision logic circuit comparison determines whether the current unassigned input pulse parameter data signal should be stored in the currently operating first cluster processor circuit or whether a non-operating cluster processor circuit should be activated to store the current unassigned input pulse parameter data signal. A newly operating cluster processor circuit represents a new sorting classification of input pulse parameter data signals received. In the preferred embodiment, two threshold value signals are utilized. They are the 70% and 10% threshold value signals. If it is assumed that the probability density function estimation value signal for the currently operating first cluster processor circuit is at least equal to the 70% threshold value signal, then the current unassigned input pulse parameter data signal will be stored in the currently operating first cluster processor circuit. Therefore, after comparing the probability density function estimation value signal of the currently operating first cluster processor circuit with the 70% and 10% threshold value signals, the decision logic circuit will generate and provide a decision address signal to the switching circuit 13 corresponding to the currently operating first cluster processor circuit. The decision address signal directs the switching circuit to transmit the current unassigned input pulse parameter data signal to the first register of the pulse buffer memory circuit 19 for temporary storage.

If the probability density function estimation value of the currently operating first cluster processor circuit is at most equal to the 10% threshold value signal, then a decision address signal will be transmitted instructing the switching circuit to activate a previously non-operating cluster processor circuit. The previously non-operating cluster processor circuit is now referred to as a newly operating cluster processor circuit. The switching circuit then transmits the current unassigned input pulse parameter data signal to the first register of the pulse buffer memory circuit of the newly operating cluster processor circuit for temporary storage. The activation of the newly operating cluster processor circuit corresponds to a new type of input pulse parameter data signal received by the APNN system.

If the probability density function estimation value signal generated by the currently operating first cluster processor circuit is greater than the 10% and less than the 70% threshold value signals, then a different decision address signal is transmitted by the decision logic circuit 11 to the switching circuit 13. This decision address signal instructs the switching circuit to assign the current unassigned input pulse parameter data signal to a storage register circuit 12 for temporary storage. The input pulse parameter data signal stored in the storage register circuit is saved so that the APNN system can analyze the stored input pulse parameter data signal in greater detail at a later time. The input pulse parameter data signal stored in the storage register circuit is not used in subsequent calculations of probability density function estimation value signals. If desired, this unassigned input pulse parameter data signal stored in the storage register circuit can undergo a second level of analysis called deinterleaving. After the data has been deinterleaved, it can be sorted and stored in any currently operating or newly operating cluster processor circuit.

Figure 3:
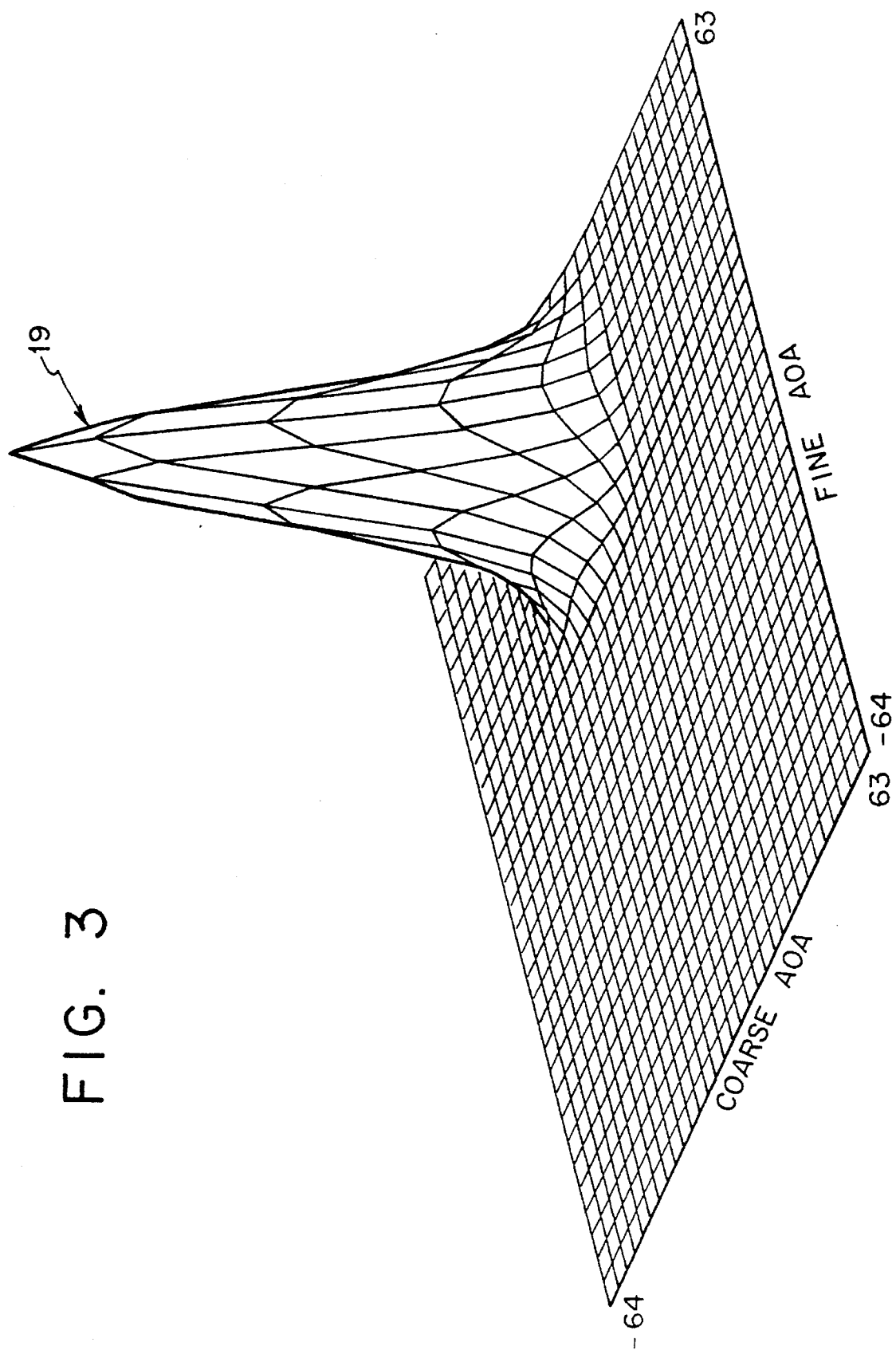
FIG. 3 is a graphical representation of a decision boundary of a 2-dimensional probabilistic neural network, after sorting one input parameter data signal.

The probability density function estimation value signal graph for the first cluster processor circuit containing the first input pulse parameter data signal is shown in FIG. 3. The probability density function estimation is shown by a two variable, two dimensional graph of, for example, coarse AOA vs fine AOA, as shown by reference numeral 19. Similar graphs can be made having different coordinate axes corresponding to the types of parameters which represent the input pulse parameter data signal. From FIG. 3, it is possible to measure statistical properties and to determine sorting performance in a quantitative manner.

Figure 4:
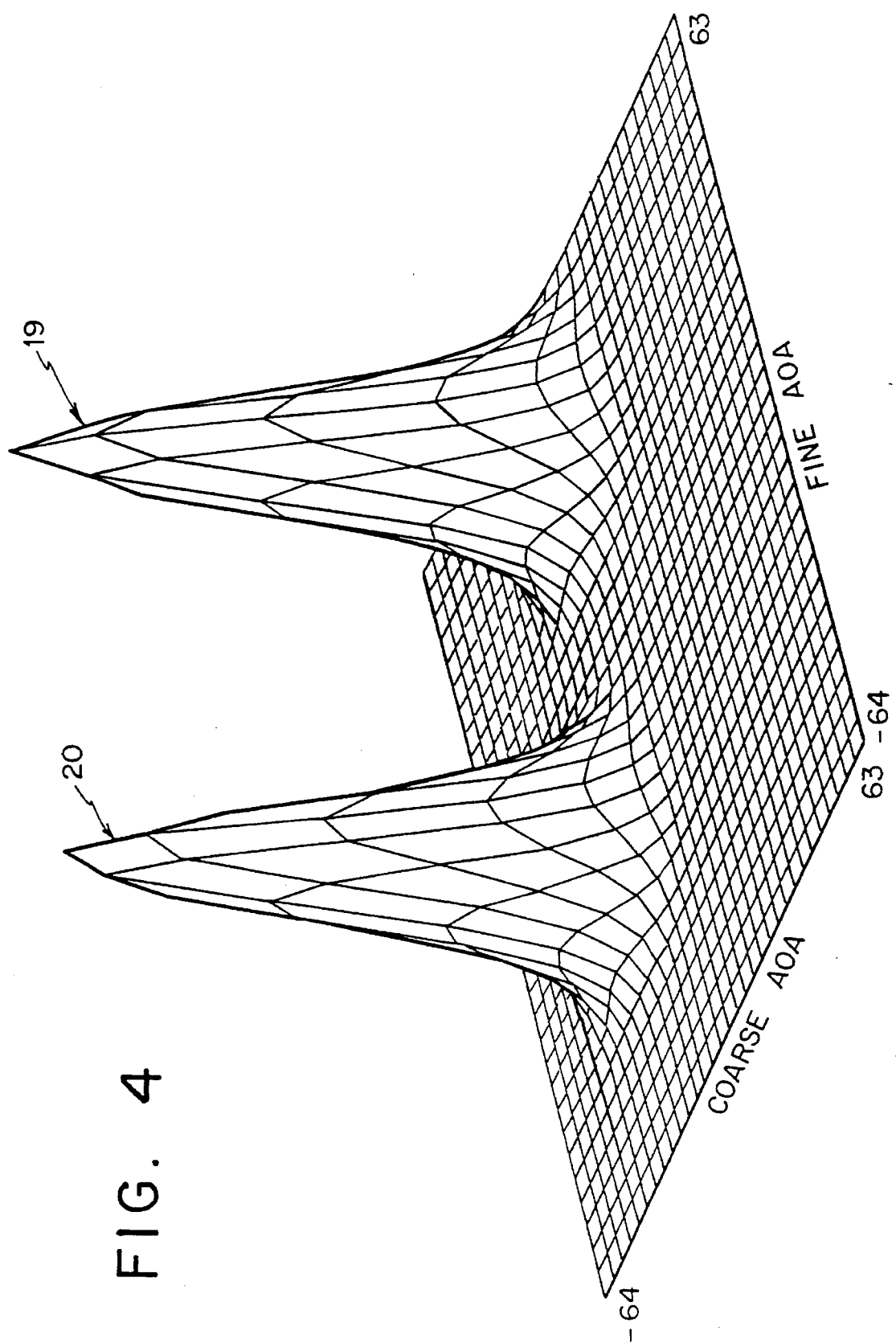
FIG. 4 is a graphical representation of a decision boundary of a 2-dimensional probabilistic neural network, after sorting two input parameter data signals.

As a second unassigned input pulse parameter data signal (Pulse No. 2) enters the system, initialization is not needed because the system has been operating. Therefore, the current unassigned input pulse parameter data signal (Pulse No. 2) is provided to each processing element of the first cluster processor circuit. The previous input pulse parameter data signal (Pulse No. 1), which is stored in the first register of the pulse buffer memory circuit 19 of the currently operating first cluster processor circuit, is provided to the first processing element along with Pulse No. 2. All other registers of the first cluster processor circuit which do not contain data signals provide a logic zero to corresponding processing elements. Each processing element generates and provides a signal to the corresponding exponential function circuit 16. The summation circuit 17 transmits the output signal of the cluster processor circuit to the decision logic circuit 11. The decision logic circuit performs a series of comparisons to see whether the probability density function estimation value signal of the first currently operating cluster processor circuit corresponding to Pulse No. 2 is at least equal to the 70% threshold value signal, at most equal to the 10% threshold value signal, or greater than the 10% and less than the 70% threshold value signal. If it is assumed that the current unassigned input pulse parameter data signal (Pulse No. 2) has less than a 10% probability density function estimation value as determined by the currently operating first cluster processor circuit, then the decision logic circuit provides a decision address signal to the switching circuit 13 to activate a previously non-operating cluster processor circuit. This newly operating cluster processor circuit corresponds to a new classification of input pulse parameter data signals. The switching circuit then transmits the current unassigned input pulse parameter data signal (Pulse No. 2) to the first register of the pulse buffer memory circuit of the newly operating second cluster processor circuit. The current unassigned input pulse parameter data signal (Pulse No. 2) is now referred to as an assigned input pulse parameter data signal. The probability density function estimation value signal graph showing the first and second currently operating cluster processor circuits and the corresponding assigned input pulse parameter data signals is shown by reference numerals 19 and 20 in FIG. 4.

As the next current unassigned input pulse parameter data signal (Pulse No. 3) is received and introduced to the adaptive probabilistic neural network, signal generation by the two currently operating cluster processor circuits is performed concurrently (i.e., in parallel). This is a clear benefit to using the neural network system over previous pulse sorting systems that operated by a rule-base method. The present APNN parallel processing system allows for numerous computations in a shorter time period.

Assuming that the two currently operating cluster processor circuits compute a probability density function estimation value signal using Pulse No. 3, both probability density function estimation value signals are transmitted by the summation circuit of each currently operating cluster processor circuit to the decision logic circuit 11. Once again, the previously stated 10%–70% threshold value signal comparison occurs. However, if both currently operating cluster processor circuits have a probability density function estimation value signal of greater than 70%, then the decision logic circuit will output a decision address signal corresponding to the currently operating cluster processor circuit having the larger probability density function estimation value signal. Assuming that the probability density function estimation value signal of the first currently operating cluster processor is larger than the probability density function estimation value signal of the second currently operating cluster processor, and further assuming that both estimation value signals are greater than the 70% threshold value signal, then the decision logic circuit will provide a decision address signal to the switching circuit corresponding to the currently operating first cluster processor circuit. Therefore, the switching circuit 13 assigns the current unassigned input pulse parameter data signal (Pulse No. 3) to the first register of the pulse buffer memory circuit 19 of the currently operating first cluster processor circuit. Accordingly, the previously assigned input pulse parameter data signal (Pulse No. 1) that was stored in the first register of the pulse buffer memory circuit of the currently operating first cluster processor circuit is shifted to the second register of the pulse buffer memory circuit. For each new input pulse parameter data signal that is introduced to the pulse buffer memory circuit of the currently operating first cluster processor circuit, the assigned input pulse parameter data signal is shifted to the next register until the assigned input pulse parameter data signal reaches the end of the pulse buffer memory circuit. When the assigned input pulse parameter data signal reaches the end of the pulse buffer memory circuit, it is discarded.

Figure 5:
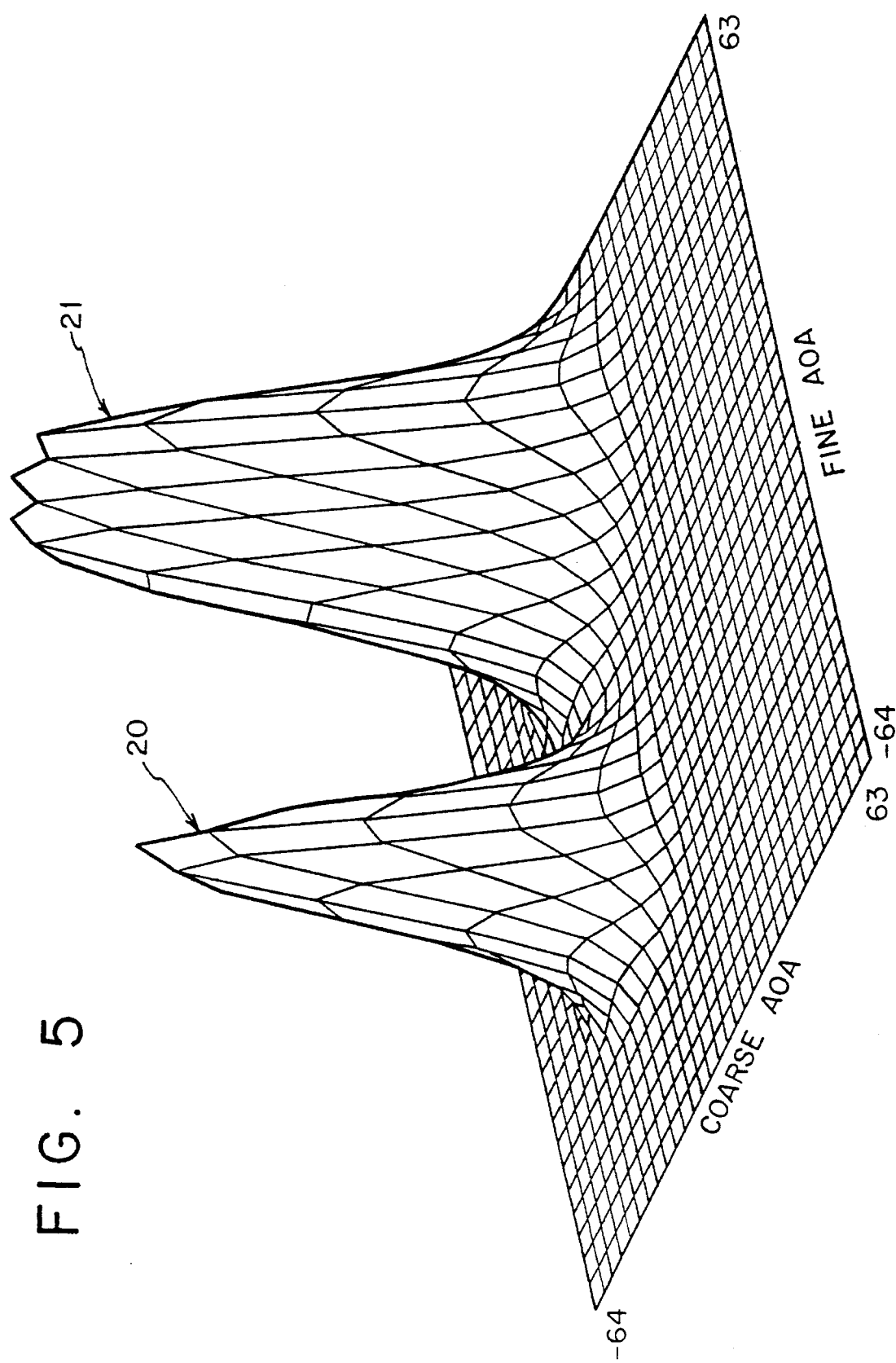
FIG. 5 is a graphical representation of a decision boundary of a 2-dimensional probabilistic neural network, after sorting three input parameter data signals.

FIG. 5 shows the probability density function estimation for the two currently operating cluster processors after the APNN system has received three input pulse parameter data signals. Reference numeral 21 represents the probability density function estimation value generated by the currently operating first cluster processor having two input pulse parameter data signals sorted therein.

The real time adaptive probabilistic neural network of the present invention is advantageously designed so that sorting of pulses at pulse arrival rates of over 10 million/sec can be achieved based on current VLSI technology. This is possible because the APNN system generates output signals using parallel processing. Previously used sorting methods generated output signals sequentially. The faster parallel processing enables the current APNN system to achieve a real time response.

Since the sorting process is based on a joint probability of the entire input pulse parameter data signal matching the input pulse parameter data signals previously sorted and stored in each cluster processor circuit, the system is capable of producing approximate results from noisy and incomplete data. This yields increased sorting accuracy as compared with previous sorting systems.

The adaptive probabilistic neural network of the present invention is also advantageously designed to provide a measure of the amount of error that will be tolerated by the system. This corresponds to the threshold value signals which are set by the system operator (i.e., 10% and 70% threshold value signals). The threshold value signals can be selected as desired.

Even though the above description of the real time data sorting adaptive probabilistic neural network specifically referred to "pulsed signals", the neural network system may also be applied to continuous wave (CW) signals which may then be sorted as previously described.

In addition to the above description of radar pulse sorting, a probabilistic neural network can also be specifically utilized for assisting in the detection and identification of gaseous molecular compounds located in an atmospheric region. The interaction with matter of electromagnetic radiation having wavelengths between 1 and 00 μm induces either rotational or vibrational energy level transitions, or both, within the molecules involved. This region, from 1 to 300 μm, is usually referred to as the infrared. The frequencies of infrared radiation absorbed by a molecule are determined by its rotational energy levels and by the force constants of the bonds in the molecule. Since the energy levels and force constants are usually unique for each molecule, the infrared spectrum of each molecule is also usually unique. The qualitative analytical use of the infrared region for molecular identification is based on this fact. Because of each molecules individuality, infrared spectra of organic compounds are considered equivalent to, or superior to, the preparation of chemical derivations for the identification of species in organic chemistry. For this reason the infrared portion of the spectrum is often called the fingerprint region. Although almost every compound has a unique infrared spectrum, various groupings within a molecule have well-defined regions of absorption. For example, hydroxyl groups in alcohols absorb strongly at 2.8, 7.3, and about 8.5 μm; ester carbonyls absorb from 5.7 to 5.8 μm; and free amino groups absorb at 3.0 and from 6.1 to 6.4 μm. However, the most relevant portion of the fingerprint region is the 7–14 μm range.

Figure 6:
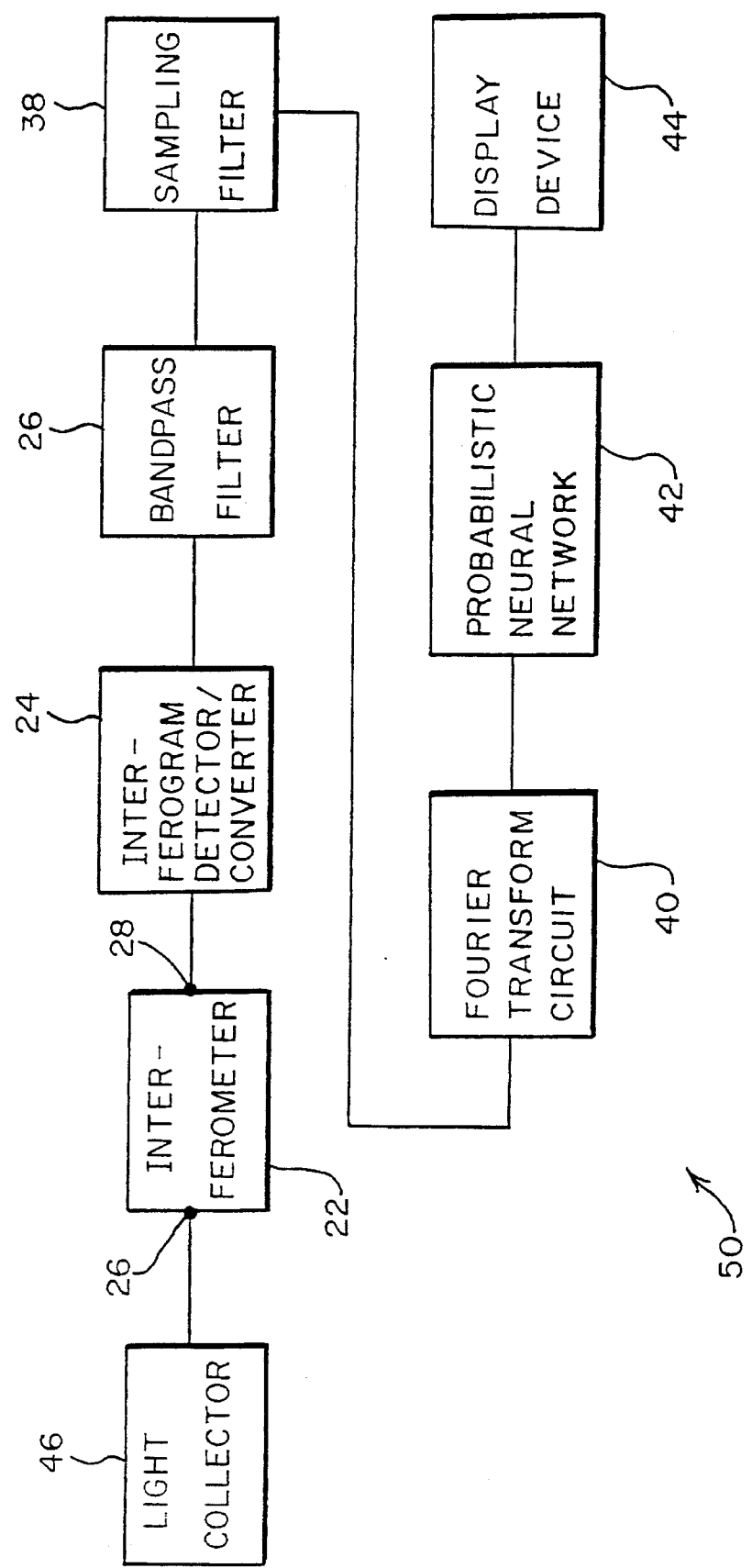
FIG. 6 is a block diagram of an apparatus for detection of molecular vapor in an atmospheric region in accordance with the present invention.

Referring now to FIG. 6 of the drawings, a preferred apparatus for detecting molecular vapor in an atmospheric region constructed in accordance with the present invention will now be described. The apparatus for detecting molecular vapor 50 includes an interferometer 22 coupled to an interferogram detector/converter 24.

The interferometer 22, preferably a Fourier transform spectrometer (FTS) such as a Michelson interferometer, is designed to collect light energy indicative of a spectral region which includes the spectral features of all molecular vapor species present in the sampled atmospheric region. The interferometer (based on the Michelson interferometer) applies a unique and characteristic modulation frequency to each spectral frequency so that all spectral features are incorporated into the same spatial scene. The Fourier transform spectrometer (FTS) is preferable because the spectral resolution of the FTS is adjustable as compared to other spectrometers and because the FTS can simultaneously capture the full infrared spectrum between 2 and 14 μm. As a result, identification of the presence of particular molecules can be conducted by matching the spectral resolution provided by the FTS to the spectral features of the molecular components of the atmosphere.

The interferometer 22 includes an input port 26 and an output port 28. The input port of the interferometer receives a CW or pulsed light parameter data signal corresponding to the amount of infrared radiation present in the atmospheric region under examination. In response, the interferometer provides an interferometer molecular parameter data signal at the output port. The interferometer molecular parameter data signal is generated by the interferometer as a result of beamsplitters, compensators and reflectors contained within the interferometer, and as known in the art. Preferably, the one or more reflectors (which may be plane mirrors or another type of retro-reflector) are uniformly or incrementally moved during a scan from an initial starting position through a zero-burst position, where the reflectors are equidistant from the beamsplitter, to a final position wherein the reflectors are at their furthest point from equidistance. The light signal from the input port of the interferometer is divided by the beamsplitter and then returned from the reflectors to the beamsplitter where the light signal is recombined (partially in and partially out of phase) to become the output signal of the interferometer. Thereafter, the interferometer output signal (interferometer molecular parameter data signal) is provided by the interferometer output port to the interferogram detector/converter.

Figure 7:
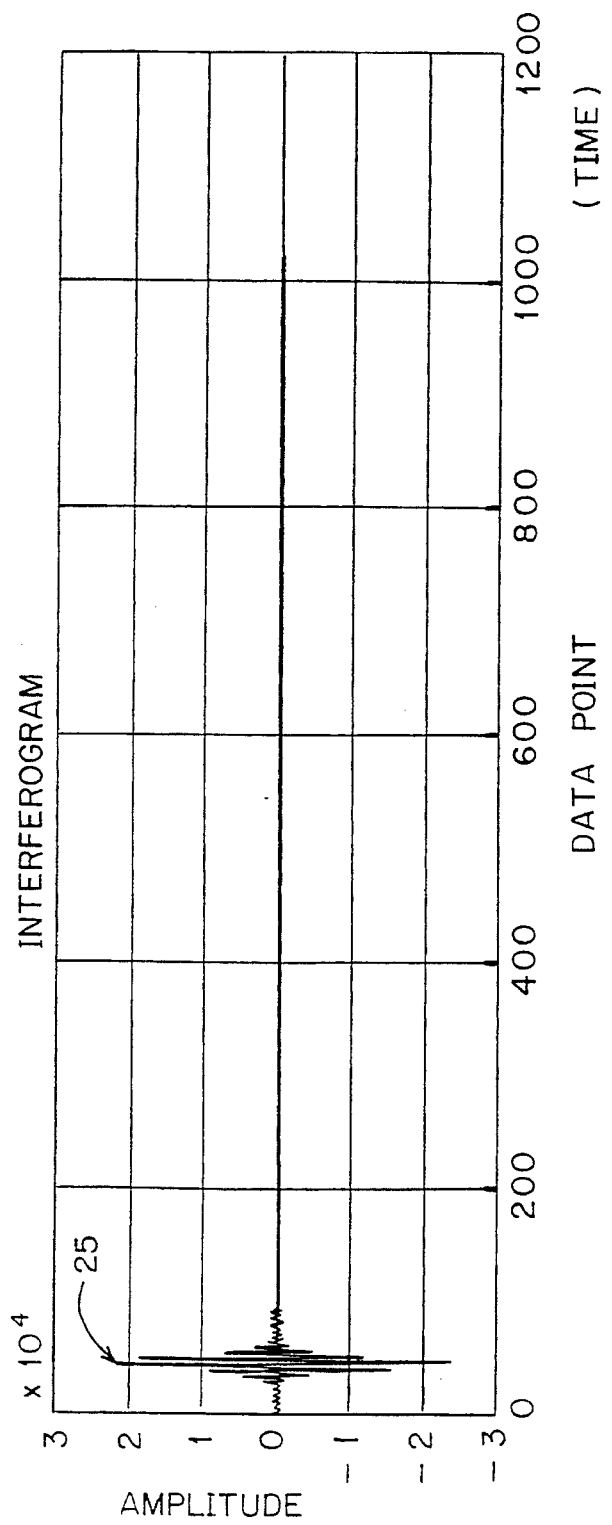
FIG. 7 is a graphical representation of an interferogram detector/converter output signal after receiving an interferometer molecular parameter data signal from an interferometer in accordance with the present invention.

The interferometer molecular parameter data signal represents the change in intensity of infrared light in relation to the location of the beamsplitter, compensators and reflectors. The interferometer molecular parameter data signal is provided to the interferogram detector/converter 24 for collection and recordal. In a preferred embodiment of the present invention, the interferogram detector/converter 24 preferably only operates on the 7–14 μm region of the infrared spectrum because those wavelengths obtain distinctive spectral characteristics for a wide variety of molecules. However, this range could be larger or narrower depending upon the characteristics of the specific molecular vapors. A sample plot of the interferometer molecular data signal detected by the interferogram detector/converter 24 is illustrated in FIG. 7 wherein the intensity of light is plotted against the position of the beamsplitter, compensator and reflectors. In the example of FIG. 7, 1024 data points are shown and were taken on the "longer side" of the interferogram following the zero-burst 25. The zero-burst is the configuration of the interferometer which provides the maximum amplitude signal.

Figure 8:
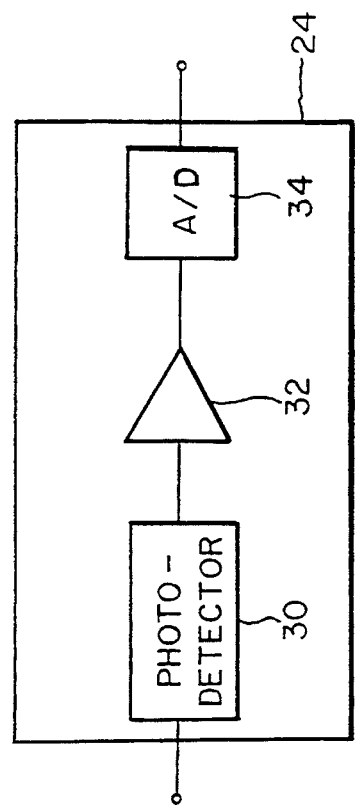
FIG. 8 is a block diagram of the interferogram detector/converter formed in accordance with the present invention.

Referring now to FIG. 8, the interferogram detector/converter 24 preferably includes a semiconductor photodetector 30 such as a cooled MCT (mercury cadmium telluride) detector, an InSb (indium antimonide) detector or the like. A suitable cooled MCT photodetector is manufactured by Graseby Corporation as Part No. 1640036. The semiconductor photodetector receives the interferometer molecular parameter data signal and provides an interferogram molecular parameter data signal which includes a plurality of discrete data points (in this embodiment 1024 data points). The interferogram detector/converter also preferably includes an amplifier 32, electrically coupled to the photodetector 30, for amplifying the interferogram molecular parameter data signal provided by the photodetector so as to increase the signal strength of the interferogram output signal. The amplifier provides, as an output signal, an amplified interferogram molecular data signal. A suitable amplifier for use is manufactured by Linear Tech Corporation as Part No. LT1028. Additionally, the interferogram detector/converter preferably includes an analog to digital (A/D) converter 34 such as Part No. ADC5020 manufactured by Analogic Corp. The analog to digital converter converts the analog amplified interferogram molecular data signal received from the amplifier to a digital amplified interferogram molecular data signal having a first plurality (1024) of discrete data point signals.

The interferometer 22 and interferogram detector/converter 24 are also manufactured and commercially available as a combined unit commonly referred to as a Fourier transform infrared (FTIR) spectrometer. A suitable FTIR spectrometer for use as the interferometer and interferogram detector/converter is the FTIR Air Monitoring System manufactured by MIDAC Corporation of Irvine, Calif.

Referring again to FIG. 6, in a preferred embodiment of the present invention, the apparatus for detection of molecular vapors in an atmospheric region may also include a bandpass filter 36 which is electrically coupled to the interferogram detector/convertor 24 for receiving the 1024 data points of the interferogram detector/converter output signal. More specifically, the bandpass filter substantially permits passage of a plurality of discrete data points of the interferogram molecular parameter data signal proximate to a first frequency to which the bandpass filter is tuned. The bandpass filter receives the discrete output signal from the interferogram detector/convertor and provides a bandpass filter output signal representing a first plurality of discrete output signals corresponding to portions of the interferogram molecular parameter data signal proximate to the first frequency.

The bandpass filter 36 is preferably a digital filter whose center frequency and bandwidth can be tuned to substantially remove background noise (background infrared radiation) from the interferogram molecular parameter data signal. A suitable bandpass digital filter is a finite impulse response (FIR) filter having a tapped delay line configuration as known in the art. Specifically, the digital filter is employed to extract spectral features of a specific group of molecules from the infrared spectral information gathered by the interferometer 22. The FIR bandpass filter has several features which make it attractive for molecular recognition. First, a linear phase response can be achieved so that the interferogram molecular parameter data signal provided to the bandpass filter can be reconstructed without phase distortion. Second, FIR filters are inherently stable and therefore instability problems do not arise when several FIR filters are cascaded to achieve a relatively high out-of-band noise rejection. Finally, the structure of FIR filters is relatively simple and efficient implementation can be achieved by either hardware or software.

Many optimization techniques have been developed for the design and implementation of FIR filters. The most widely accepted approach is discussed in "A Unified Approach To The Design Of Optimum FIR Linear-Phase Digital Filters", by McClellan and Parks in IEEE Transactions on Circuit Theory, pp. 699–701, November 1973, the disclosure of which is incorporated by reference. McClellen and Parks disclose a general-purpose computer program to design optimal FIR filters for a wide variety of uses. A very attractive aspect of FIR filters is that multiple passbands (frequencies that are not removed by the filter) and stopbands (frequencies that are removed by the filter) can be realized by a single filter configuration. This is often needed to extract molecular fingerprints consisting of multiple absorption bands of differing spectral widths. The passbands can be designed to match the desired molecular spectral features to be extracted from the interferometer molecular parameter data signal.

Figure 9:
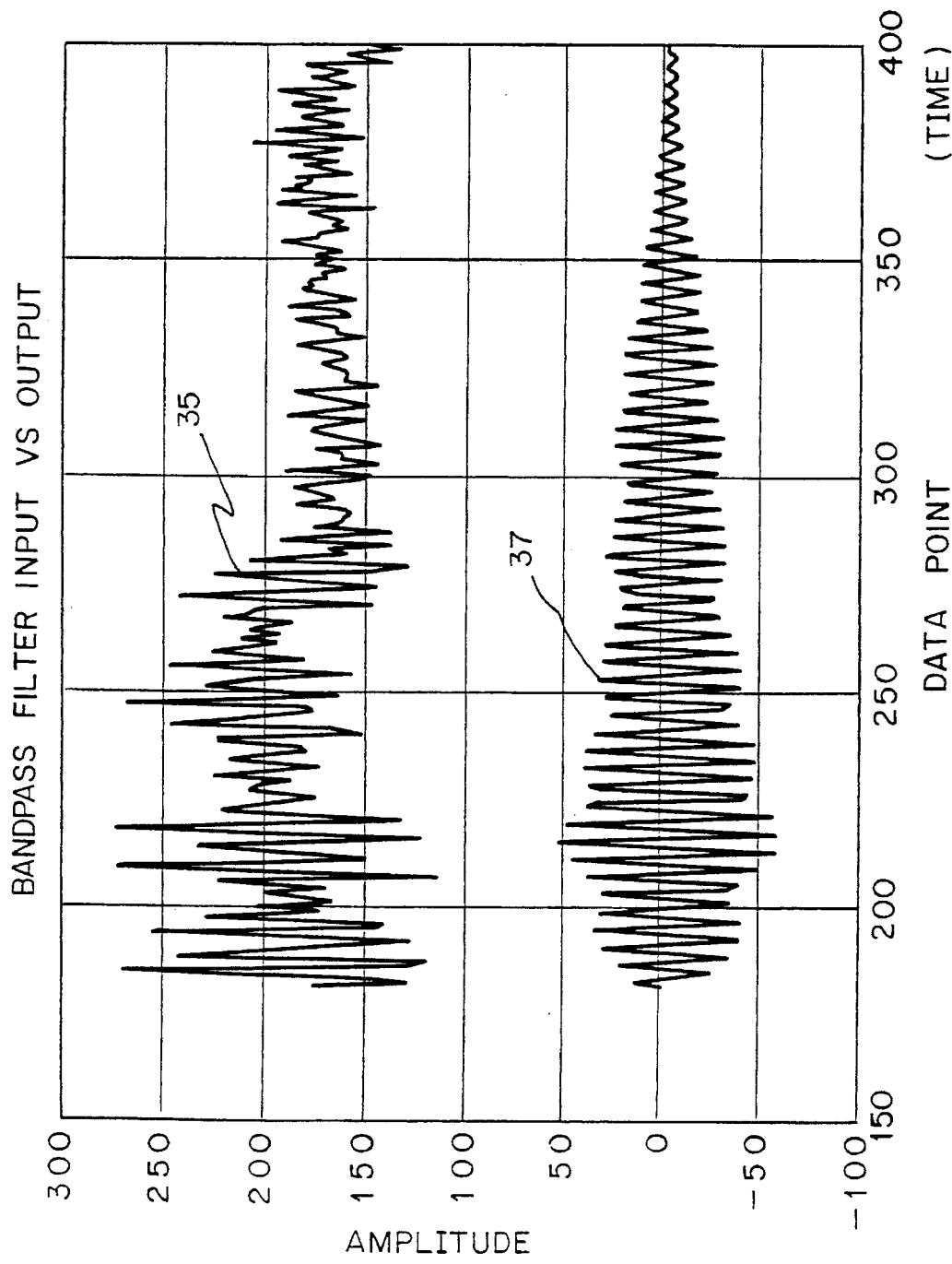
FIG. 9 is a graphical representation and comparison of signals provided to and signals provided from a bandpass filter in accordance with the present invention.

Preferably, the bandpass filter 36, (which may also be referred to as a spectral filter), is employed to remove background infrared radiation signals from the interferogram molecular parameter data signals provided by the interferogram detector/converter. FIG. 9 illustrates the result of an input signal 35, having a relatively low signal to noise ratio from data points 180–400, being provided to a bandpass filter. The output signal 37, after treatment by the filter and removal of the dc background component and background noise, as shown in FIG. 9, has a noticeably higher signal to noise ratio than that of the input signal.

Preferably coupled to the bandpass filter 36 is a sampling filter 38 (alternatively referred to as an adaptive sampling filter) which receives the bandpass filter output signal and provides a sampling filter output signal. In a preferred embodiment, the sampling filter is manipulated so as to select a range of the first plurality of discrete data point signals provided by the A/D converter of the interferogram detector/convertor and bandpass filter so as to provide a second plurality of discrete data point signals. Preferably, based upon the bandwidth and center frequency of the bandpass filter, the sampling filter is turned to select a plurality of data points from the first plurality of discrete data point signals provided by the interferogram detector/converter around the center frequency of the bandpass filter. In a preferred embodiment, of the 1024 data points provided in the interferogram molecular parameter data signal, only approximately 220 data points (data points 180–400) are selected because these points were deemed to include infrared information relevant to the presence of specific molecular vapors. The remaining block of data points (1024−220= 804 data points) of the initial 1024 data points which were not passed by the sampling filter are zero padded (i.e., the data points from 1–179 and 401–1024 are substantially set at zero amplitude), while data points 180–400 substantially retain the values provided by the bandpass filter output signal. This set of data points with zero padding from 1–179 and 401–1024, and non-zero amplitude values at data points 180–400 represents a sampling filter output signal and a second plurality of discrete data point signals.

Referring again to FIG. 6 and in the preferred embodiment of the present invention, the apparatus for detecting molecular vapors in an atmospheric region may further include a Fourier transform circuit 40 electrically coupled to the sampling filter 38. Preferably, the Fourier transform circuit receives the second plurality of discrete signals from the sampling filter to convert the sampling filter output signal from a discrete time domain signal to a discrete frequency domain signal. The Fourier transform circuit provides a Fourier transform molecular parameter data signal representing a spectral waveshape of the sampling filter output signal. A suitable commercially available Fourier transform circuit is Part No. PDSP16510 manufactured by Plessey Corporation of the United Kingdom.

Figure 10:
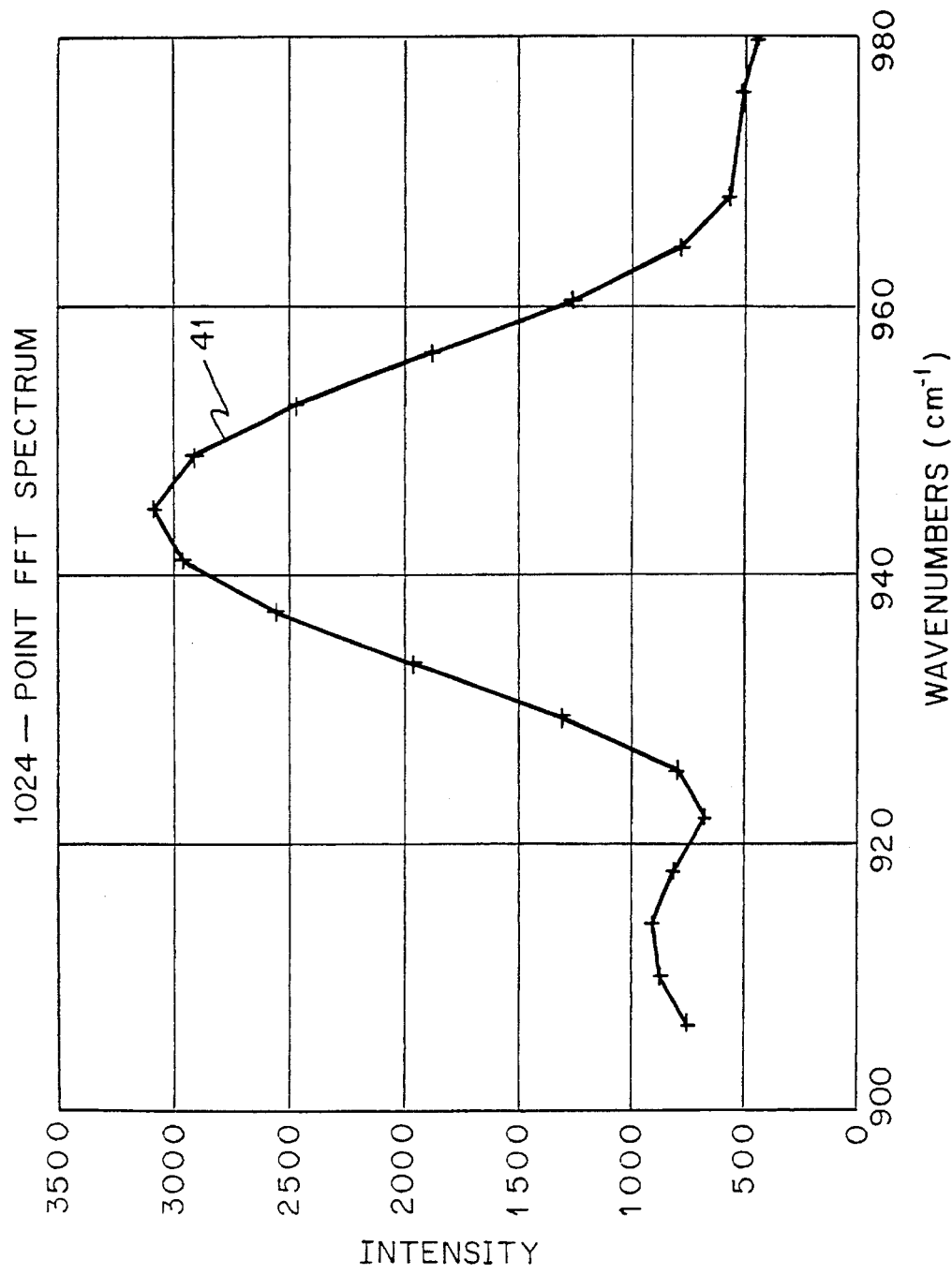
FIG. 10 is a graphical representation of a Fourier transform molecular parameter data signal provided by a Fourier transform circuit in accordance with the present invention.

As mentioned previously, the second plurality of discrete data point signals provided to the Fourier transform circuit are zero padded. The zero padding is performed so that when the Fourier transform circuit provides an output signal, the output signal will have a smoother spectral representation in the frequency domain that maintains the frequency resolution available from the data points taken, approximately 4 $cm^{-1}$ for the above 1024 data points. The Fourier transform circuit output signal 41 provides a spectrum of the intensity of infrared radiation at specific wavelength intervals or bins. FIG. 10 illustrates a sample plot the intensity of infrared radiation intervals or bins between approximately 905–979 wavenumbers ($cm^{1-}$) for the Fourier transform circuit output signal 41. Preferably, the Fourier transform circuit output signal will provide an approximate 20 data point output signal indicative of spectral features at specific wavelengths. However, a Fourier transform circuit output signal having greater or less than 20 data points is foreseen.

The output of the Fourier transform circuit 40 is preferably electrically coupled to a probabilistic neural network processor 42 wherein each pulse buffer memory circuit includes at least as many registers as the number of data points in the output signal of the Fourier transform circuit (i.e., in the above example, 20). The probabilistic neural network is preferably configured and operates as described with respect to FIGS. 1–5.

As shown if FIG. 6, the output of the probabilistic neural network 42 is preferably coupled to a display device 44 for providing an indication as to the presence and concentration of various molecular species present in the atmospheric region under test.

In an alternative embodiment of the present invention, the apparatus for detecting molecular vapors may also include a light collector 46 electrically coupled to the input port 26 of the interferometer 22. A suitable light collector for use with the aforementioned Michelson interferometer is a Newtonian telescope having an aperture of approximately 10 inches focusing infrared radiation on the interferometer to provide additional sensitivity for the apparatus. The apparatus may also include a light filter positioned between the atmospheric region under observation and the light collector, or between the light collector and the interferometer so as to substantially remove wavelengths of the infrared spectrum which are known not to contain information pertinent to the detection of molecular vapors.

In yet another embodiment to the present invention and in its most basic form, the apparatus for detecting molecular vapors may consist of only the interferometer 22, interferogram detector/convertor 24 and the probabilistic neural network 42. Alternative configurations of the apparatus as additionally including one or more of the light collector 46, bandpass filter 36, sampling filter 38 and Fourier transform circuit 40 as previously described may effected.

Although an illustrative embodiment of the present invention has been described herein with reference to the accompanying drawings, it is to be understood that the invention is not limited to the precise embodiment, and that various other changes and modifications may be effected therein by one skilled in the art without departing from the scope or spirit of the invention.

We claim:

1. A real time data sorting adaptive probabilistic neural network system comprising:

(a) a plurality of cluster processor circuits, each cluster processor circuit generating an output signal representing a probability density function estimation value, each cluster processor circuit including:

(1) an input buffer memory circuit, the input buffer memory circuit having a plurality of serially connected registers for storing input parameter data signals assigned to a respective cluster processor circuit;

(2) a plurality of processing elements, each of the processing elements being coupled to a corresponding register of the input buffer memory circuit for receiving assigned input parameter data signals stored in the input buffer memory circuit, each of the processing elements further being responsive to current unassigned input parameter data signals, each processing element providing an output signal;

(3) a plurality of exponential function circuits, each of the exponential function circuits being coupled to a corresponding processing element, each exponential function circuit performing an exponential function on the output signal of each processing element and providing an output signal in response thereto; and (4) a summation circuit coupled to each of the exponential function circuits of the respective cluster processor circuit, the summation circuit being responsive to the output signals from the exponential function circuits and performing an addition function thereon and providing an output signal representing a probability density function estimation value;

(b) a decision logic circuit, the decision logic circuit being coupled to the summation circuit of each cluster processor circuit, the decision logic circuit comparing the output signal of each summation circuit of the corresponding cluster processor circuit with at least a first threshold value signal, and providing a decision address signal in response thereto;

(c) a switching circuit, the switching circuit being coupled to the decision logic circuit and to each of the cluster processor circuits and further being responsive to current unassigned input parameter data signals and assigning the current unassigned input parameter data signals to a respective cluster processor circuit for storage in the input buffer memory circuit of the respective cluster processor circuit in response to the decision address signal from the decision logic circuit; and (d) a storage register circuit, the storage register circuit being coupled to the switching circuit, the switching circuit providing the current unassigned input parameter data signal to the storage register circuit when the output signal of the summation circuit of each cluster processor circuit is less than the first threshold value signal and greater than a second threshold value signal.

2. A system as defined by claim 1, wherein the switching circuit is coupled to the input buffer memory circuit of each cluster processor circuit, the switching circuit assigning the current unassigned input parameter data signal to the input buffer memory circuit of a currently operating cluster processor circuit if the summation circuit output signal representing a probability density function estimation value of the currently operating cluster processor circuit is at least equal to a first threshold value signal, and wherein the switching circuit assigns the current unassigned input parameter data signal to the input buffer memory circuit of a newly operating cluster processor which was previously a non-operating cluster processor if the summation circuit output signal representing the probability density function estimation value of each currently operating cluster processor circuit is less than the first threshold value.

3. A method of sorting input parameter data signals which comprises the steps of:

(a) inputting a current unassigned input parameter data signal into at least one of a plurality of processing elements contained within a plurality of currently operating cluster processor circuits;

(b) generating a first signal representing a probability density function estimation value in response to the input parameter data signals of each currently operating cluster processor circuit of the plurality of cluster processors, the probability density function estimation value signal being generated using the current unassigned input parameter data signal and using a plurality of assigned input parameter data signals stored in an input buffer memory circuit of each currently operating cluster processor circuit;

(c) comparing the first signal representing the probability density function estimation value generated by each currently operating cluster processor circuit to at least a first threshold value signal in a decision logic circuit;

(d) generating a decision address signal in response to the comparison of the first signal and the first threshold value signal, the decision address signal being provided to a switching circuit, the decision address signal denoting a currently operating cluster processor circuit when the first signal representing the probability density function estimation value is at least equal to the first threshold value signal, the decision address signal denoting and activating a non-operating cluster processor circuit when the first signal representing the probability density function estimation value is at most equal to the first threshold value signal;

(e) assigning the current unassigned input parameter data signal from the switching circuit to the cluster processor circuit corresponding to the decision address signal provided to the switching circuit; and (f) storing the current unassigned input parameter data signal in the input buffer memory circuit of the cluster processor circuit according to the decision address signal received by the switching circuit.

4. A method as defined by claim 3, which includes the further steps of:

comparing the first signal representing a probability density function estimation value to a second threshold value signal in the decision logic circuit; and denoting a storage register circuit and assigning the current unassigned input parameter data signal from the switching circuit to the storage register circuit when the first signal, representing the probability density function estimation value, is less than the first threshold value and greater than the second threshold value signal.

5. A method as defined by claim 3, which includes the further step of manually setting the level of at least one of the first and second threshold value signals.

6. A method as defined by claim 3, wherein the first threshold value signal is greater in magnitude than the second threshold value signal.

* * * * *